United States Patent Office 3,773,902
Patented Nov. 20, 1973

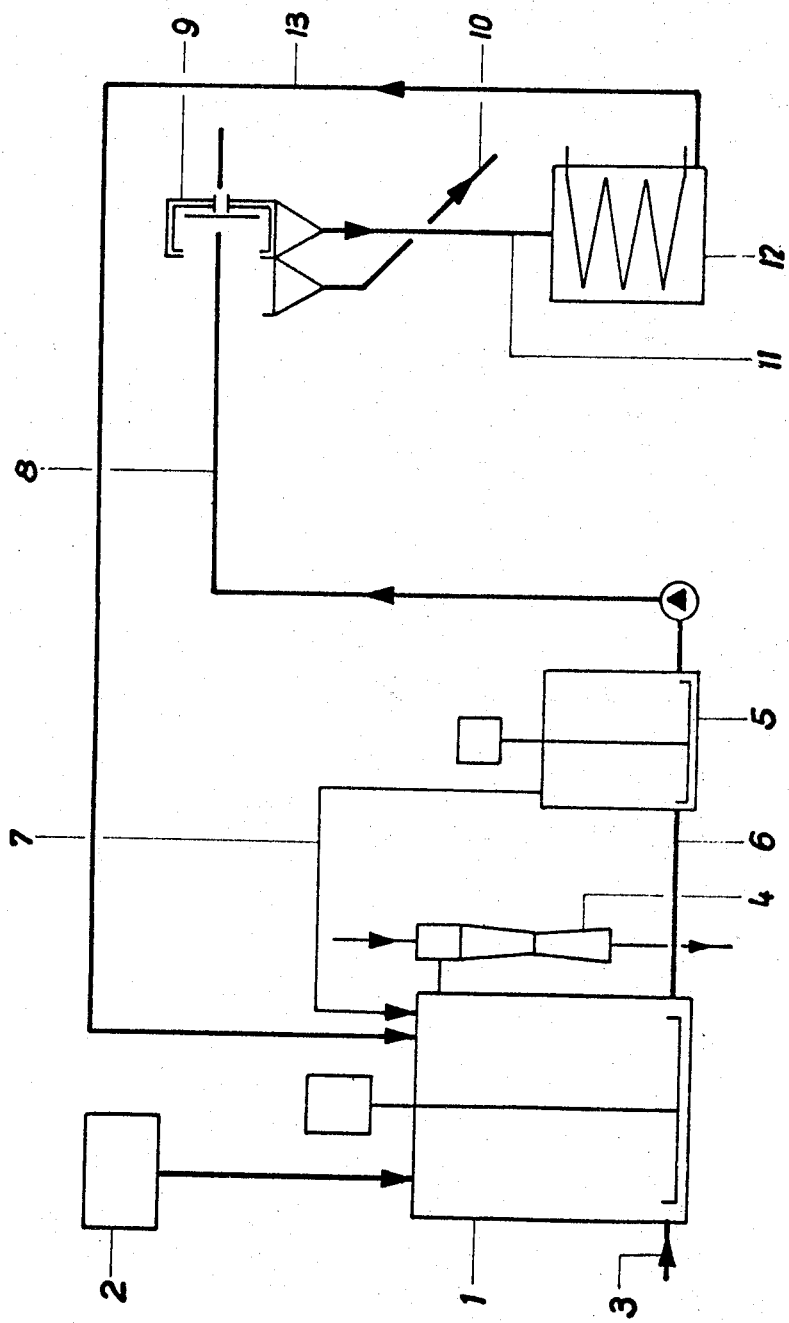

3,773,902
PROCESS FOR THE PREPARATION OF
POTASSIUM CARBONATE HYDRATE
Ulrich Neumann, Rodenkirchen, Germany, assignor to
Chemical Dr. A. Zieren, GmbH & Co. KG, Cologne
Braunsfeld, Germany
Filed May 26, 1971, Ser. No. 146,986
Claims priority, application Germany, May 26, 1970,
P 20 25 610.4
Int. Cl. C01d 7/00
U.S. Cl. 423—421
10 Claims

ABSTRACT OF THE DISCLOSURE

An economically feasible continuous process for the production of potassium carbonate by the carbonation of a potassium hydroxide solution with $CO_2$ on a commercial scale which is trouble-free and requires simple apparatus in which a stream of the potassium hydroxide solution is fed to a reaction zone where it is reacted with $CO_2$ at 80–135° C. and 130 torr-atmospheric pressure; sufficient water is evaporated from the solution in the reaction zone to precipitate $K_2CO_3 \cdot 1\frac{1}{2}H_2O$; a stream of the precipitated potassium carbonate and a portion of the solution is removed from the reaction zone as a slurry; the liquid and solid phases of the slurry are separated; and the separated liquid phase is recycled to the reaction zone, preferably after heating to a temperature above that of the reaction zone.

BACKGROUND OF THE INVENTION

This invention relates to a process for the preparation of potassium carbonate hydrate, more particularly by reacting an aqueous potassium hydroxide solution with a carbon dioxide-containing gas.

It is known to produce potassium carbonate from electrolytically obtained potassium hydroxide solution of approximately 50% strength by the reaction with waste gases containing carbon dioxide, such as, for example, flue gas or lime kiln gas, in absorption towers. The hydrate $K_2CO_3 \cdot 1.5H_2O$ crystallizes during cooling from the hot concentrated solutions obtained by evaporation in a suitable evaporator. The salt separated by centrifuging or suction-filtering is dried at about 120° C., so that the hydrate with 1½ molecules of water is obtained as the product. The mother liquor can be again worked up in a mixture with fresh solution (Ullmann, vol. 9 (1957), p. 235). This process, due to the separation of reaction, evaporation, and crystallization processes, has the disadvantages of a high heat energy consumption and considerable initial investment costs.

It is known from Austrian patent application A 3191/68 to react sodium hydroxide solution with carbon dioxide to obtain soda ash. During this process, water is evaporated above 90° C. and sodium carbonate monohydrate is precipitated. This process is not suitable for the production of potassium carbonate hydrate, because simultaneous hydrate deposition and water vaporization according to the process as described therein is possible only at temperatures which are uneconomically high.

A work by N. K. Kishinevskij in "Zhur. Priklad. Khim." 30 (1957), pp. 185–194, deals with the kinetics of $CO_2$ absorption in potassium hydroxide solution under laminar and turbulent flow agitation conditions. However, no potassium carbonate hydrate was precipitated in this process, and the reaction temperature was 57° C. at a maximum.

It is an object of this invention to provide a process for the preparation of potassium carbonate hydrate from potassium hydroxide solution formed, for example, by potassium amalgam decomposition, with lower external heat energy requirements for the water vaporization than the known processes of the prior art. It is another object to provide such a novel method which requires the use of only few apparatus components. Other objects will be apparent to those skilled in the art to which this invention pertains.

SUMMARY OF THE INVENTION

These objects are attained in accordance with this invention by a continuous process which comprises the steps of feeding a potassium hydroxide solution to a reaction stage; reacting the potassium hydroxide in the reaction stage with carbon dioxide at a temperature of between 80 and 135° C. and a pressure of between 130 torr [mm. Hg] and atmospheric pressure; evaporating water from the reaction stage, thus precipitating potassium carbonate hydrate from the solution in the reaction stage; removing from the reaction stage as a slurry the thus-precipitated potassium carbonate hydrate separating the solid phase of the slurry from the liquid phase; and recycling the separated liquid phase to the reaction zone. The combination of the reaction between potassium hydroxide solution and carbon dioxide, the water vaporization, and the precipitation of the potassium carbonate hydrate in a single stage, as effected by the present invention, makes possible the direct utilization of the thus-liberated heat of neutralization for vaporization of the water, which vaporization is a prerequisite for the crystallization of the potassium carbonate hydrate. The evaporator and the crystallizer are eliminated, whereby the plant becomes less trouble-prone. The liberated heat of neutralization and crystallization is fully utilized for the evaporation of the water, since this heat is liberated directly in the reaction mixture. By the use of subatmospheric pressure, the temperature at which the vaporization and simultaneously the hydrate deposition occur is lowered. This also lessens the heat energy requirements of the process and eliminates the necessity of cooling means to prevent overheating of the reaction solution. The thermal load on the materials is also reduced. The hydrate thus precipitated in the reaction mixture corresponds approximately to the formula $K_2CO_3 \cdot 1.5H_2O$. The thus-separated hydrate can be separated from the mother liquor by centrifuging or by filtration. The mother liquor, which is a solution consisting of about 58–67% by weight of $K_2CO_3$, is recycled into the reaction vessel.

The gas employed for the reaction can be, for example, a $CO_2$ rich gas consisting of more than 90% by volume of $CO_2$, a lime kiln gas consisting of about 40–45% by volume of $CO_2$, or a flue gas consisting of about 8–14% by volume of $CO_2$.

In accordance with the preferred embodiment of this invention, the potassium hydroxide solution is reacted with the carbon dioxide at temperatures of between 80 and 125° C. and under pressures of between 130 and 700 torr, especially at temperatures of between 90 and 110° C. and under pressures of between 200 and 600 torr. These subatmospheric pressures can be maintained economically by means of steam jet air ejectors.

The separated mother liquor is preferably heated, prior to being recycled into the reactor, to a temperature above the reaction temperature. In this manner, there is supplied to the reaction mixture the amount of heat which is required, above and beyond the heat liberated within the reaction mixture, to vaporize the water in the potassium hydroxide solution which is introduced into the reaction zone. In a modification of this process, this external heat can also be introduced into the system at some other point, for example by preheating the potassium hydroxide solution or the $CO_2$-containing gas or by directly heating the reaction mixture. In all of these cases, a minimum of external heat is required, since the heat of reaction and crystallization is fully utilized for the water vaporization.

In accordance with the preferred embodiment of the invention, the reaction mixture is stirred or otherwise agitated by turbulence. This results in an increase in the reaction rate, since the rate of diffusion of the $CO_2$ into the solution increases, with the further result that there is a uniform temperature distribution and concentration distribution in the mixture.

The potassium carbonate sesquihydrate obtained after separation from the mother liquor can be dehydrated to anhydrous $K_2CO_3$ at temperatures of above 240° C. This step is preferably carried out in a steam-heated calcining drum. The waste gases therefrom are preferably purified in a conventional manner to remove any entrained fine particles of potassium carbonate.

The invention will be described below in greater detail with reference to the drawing, wherein a plant for conducting the process of this invention is illustrated in a schematic view.

As shown in the drawing, stirred reactor 1 is fed with a stream of potassium hydroxide solution from storage tank 2 and with a stream of $CO_2$-containing gas via conduit 3. A vacuum is produced in the reaction vessel 1 by steam jet air ejector 4 connected thereto. In reactor 1, the aqueous potassium hydroxide solution, obtained, for example, from an alkaline chloride electrolysis state connected upstream of this plant, is reacted with the carbon dioxide in the gas fed to the reactor, during which step potassium carbonate sesquihydrate is precipitated. At the same time, water is evaporated from the reaction mixture and is removed by the vacuum produced by ejector 4. The reaction mixture with the precipitated potassium carbonate sesquihydrate flows, as a suspension, via conduit 6 into agitator-equipped vessel 5, the gas space of which is in communication with that of reactor 1 via line 7, and thus is likewise maintained under a vacuum.

From vessel 5, the suspension is pumped, via conduit 8, into centrifuge 9, where the precipitated hydrate is separated from the mother liquor. The moist hydrate obtained at 10 can be dried and optionally dehydrated in a subsequent drying stage. The mother liquor passes, via line 11, into container 12 containing steam heated heat exchange coils, is heated therein, and recycled via line 13 into reactor 1.

In general, the amount of water in the incoming KOH solution should not exceed about 70% by weight of the total solution, and is preferably in the range of 60 to 40% by weight. The carbonation zone, by virtue of turbulence is usually kept at a uniform temperature within the 80-135° C. operable range. Due to minor turbulence or laminar flow, temperature variations may exist in the reactor. In this case the average temperature should be at least 80° C.

According to a preferred embodiment of the present invention, more than 70% by weight of the water of the potassium hydroxide solution is evaporated. Where the potassium hydroxide solution contains not more than 50% by weight of water, the heat of neutralization and of precipitation evolved during the carbonation is nearly sufficient to evaporate the above-mentioned portion of water.

However, in a preferred embodiment, the mother liquor separated from the slurry which is removed from the reaction zone is heated to a temperature from about 20 to 60° C. higher than the reaction temperature because the heats of neutralization and precipitation in the carbonating zone are usually insufficient to evaporate enough of the water of the KOH solution to maintain the solution at the desired $K_2CO_3$ concentration. This preheating step thus supplements the heats of neutralization and precipitation to offset the heat demand for water evaporation and the heat loss with slurry removal. Generally, the lower the KOH concentration, the more external heating is necessary to maintain the system in balance.

Specific examples of this relationship are shown in Table I.

TABLE I

| | Pressure (torr) | Reactor temperature, ° C. | Recycle mother liquor temperature, ° C. |
|---|---|---|---|
| KOH concentration, percent by weight: | | | |
| 45 | 130 | 80 | 132 |
| 50 | 130 | 80 | 126 |
| 50 | 330 | 100 | 130 |
| 50 | 540 | 112 | 133 |
| 55 | 330 | 100 | 125 |

Because the separated mother liquor is recirculated to the carbonation reactor, the entire carbonation stage thus comprises a cyclic process in which most of the water is removed with the separated precipitated potassium carbonate. It is surprising that the water can be removed by evaporation under reduced pressure at high thermal efficiency and with relatively little loss of $CO_2$ and high conversion of KOH to $K_2CO_3$.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In the plant illustrated in the drawing, 1,000 kg./h. of 50% strength potassium hydroxide solution available at 50° C. from an alkaline chloride electrolysis stage, is reacted with 115 Nm.$^3$/h. of approximately 98% $CO_2$ gas at about 100° C. The reaction mixture is under a pressure of about 300 torr. 405 kg./h. of water evaporates, during which step 592 kg./h. of potassium carbonate sesquihydrate is precipitated.

From the reactor, 6,772 kg./h. of suspension is withdrawn and separated, by centrifuging, into 5,980 kg./h. of mother liquor and 792 kg./h. of moist potassium carbonate sesquihydrate. The moist hydrate, after drying and dehydration, yields 615 kg./h. of $K_2CO_3$. The mother liquor, obtained at a temperature of 90° C., is heated by indirect heat exchange with steam of 5 atmospheres to its boiling point (about 125° C.) and is recycled into the reactor.

EXAMPLE 2

In the plant illustrated in the drawing, 440 kg./h. of 50% strength potassium hydroxide solution obtained at 85° C. from an alkaline chloride electrolysis, is reacted with 472 Nm.$^3$/h. of a flue gas having a temperature of 180° C. and containing 9.3% by volume of $CO_2$ and 18.0% by volume of $H_2O$. The reaction mixture has a temperature of about 100° C. and is under atmospheric pressure. 775 Nm.$^3$/h. of waste gas is discharged having 1.4% by volume of $CO_2$ and 43.3% by volume of $H_2O$.

From the reaction vessel, 1,660 kg./h. of suspension is withdrawn. By centrifuging, 1,320 kg./h. of mother liquor and 340 kg./h. of moist potassium carbonate hydrate are produced. From the moist hydrate, 270.5 kg./h. of $K_2CO_3$ is obtained after drying and dehydration. The mother liquor, obtained at 90° C., is heated by means of steam of 5 atmospheres to 125° C. and recycled into the reactor.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A continuous single stage process for the preparation of crystalline potassium carbonate hydrate, comprising:
   (a) reacting an aqueous solution consisting essentially of 30–70% by weight potassium hydroxide with a gas containing carbon dioxide by bubbling said gas through said aqueous solution at a temperature of 80–135° C. and at a pressure of between 130 mm. Hg and atmospheric pressure with sufficient evaporation of water to precipitate potassium carbonate hydrate crystals;
   (b) removing a stream of precipitated potassium carbonate hydrate crystals and a portion of the mother liquor as a slurry from the reaction zone;
   (c) separating the precipitated potassium carbonate hydrate crystals from the mother liquor of said slurry; and
   (d) recycling the separated mother liquor back into the reaction zone.

2. A process according to claim 1, wherein the potassium hydroxide solution is reacted with the carbon dioxide-containing gas at a temperature of between 80 and 125° C. and a pressure of between 130 and 700 mm. Hg.

3. A process according to claim 1, wherein the potassium hydroxide solution is reacted with carbon dioxide-containing gas at a temperature of between 90 and 110° C. and a pressure of between 200 and 600 mm. Hg.

4. A process according to claim 2 wherein the mother liquor, prior to being recycled, is heated to a temperature from about 20 to 60° C. above the temperature of the reaction solution in the reaction zone which maintains the latter at the selected reaction temperature and wherein the reaction solution is agitated in a turbulent manner in the reaction zone.

5. A process according to claim 4 wherein the slurry is transferred to a second zone in liquid and gaseous communication with the reaction zone prior to separation of the precipitated potassium carbonate therein.

6. A process according to claim 1 wherein the mother liquor, prior to being recycled, is heated to a temperature from about 20 to 60° C. above the temperature of the reaction solution in the reaction zone which maintains the latter at the selected reaction temperature.

7. A process according to claim 1 wherein the reaction solution is agitated in a turbulent manner in the reaction zone.

8. A process according to claim 1 wherein more than 70% by weight of the water in the potassium hydroxide solution is evaporated in the reaction zone.

9. A process according to claim 8 wherein said aqueous potassium hydroxide solution contains not more than 50% by weight water.

10. A process according to claim 9 wherein the recycled mother liquor consists essentially of about 58–67% by weight of $K_2CO_3$.

References Cited
UNITED STATES PATENTS

| | | | |
|---|---|---|---|
| 2,135,605 | 11/1938 | Stevenson | 23—63 |
| 3,202,477 | 8/1965 | Loeffler et al. | 23—63 |
| 3,254,946 | 6/1966 | Hass et al. | 23—63 |
| 3,644,089 | 2/1972 | Minz et al. | 423—421 |

OSCAR R. VERTIZ, Primary Examiner

J. COOPER, Assistant Examiner

UNITED STATES PATENT OFFICE
CERTIFICATE OF CORRECTION

Patent No. 3,773,902     Dated November 20, 1973

Inventor(s) Ulrich Neumann, et al.

It is certified that error appears in the above-identified patent and that said Letters Patent are hereby corrected as shown below:

IN THE HEADING, COLUMN 1: The Assignee of Record should read -- CHEMIEBAU DR. A. ZIEREN, GmbH & CO. KG --.

Signed and sealed this 10th day of September 1974.

(SEAL)
Attest:

McCOY M. GIBSON, JR.
Attesting Officer

C. MARSHALL DANN
Commissioner of Patents